MAGNETICALLY DRIVEN CENTRIFUGAL PUMP ASSEMBLY

Original Filed April 28, 1964 2 Sheets-Sheet 1

INVENTOR.
FREDERICK N. ZIMMERMANN

MAGNETICALLY DRIVEN CENTRIFUGAL PUMP ASSEMBLY

Original Filed April 28, 1964 2 Sheets-Sheet 2

INVENTOR.
FREDERICK N. ZIMMERMANN

United States Patent Office

Re. 26,094
Reissued Oct. 11, 1966

26,094
MAGNETICALLY DRIVEN CENTRIFUGAL PUMP ASSEMBLY

Frederick N. Zimmermann, Deerfield, Ill., assignor to March Manufacturing Co., Skokie, Ill., a corporation of Illinois Original No. 3,205,827, dated Sept. 14, 1965, Ser. No. 363,159, Apr. 28, 1964. Application for reissue Feb. 7, 1966, Ser. No. 532,509
12 Claims. (Cl. 103—87)

Matter enclosed in heavy brackets [ ] appears in the original patent but forms no part of this reissue specification; matter printed in italics indicates the additions made by reissue.

This invention relates to magnetically driven centrifugal pumps.

More particularly, this invention relates to a pumping apparatus of the type comprising a mounting bracket, a motor horizontally mounted on one side of said bracket, a centrifugal pump housing removably assembled upon the side of said bracket opposite to that supporting said motor, an impeller assembled within said pump housing and driven by said motor, and the coupling between said two elements consisting of two permanent magnets of which one magnet is associated with the shaft of the motor and the other with the impeller.

More specifically, the present invention relates to a pump assembly where the moving parts on the interior of the pump housing are hermetically sealed against the moving parts associated with the motor drive shaft by means of a cup-shaped diaphragm of non-magnetic material embodying a flange portion supported by said mounting bracket and interposed between said two magnets, said diaphragm having a vertical circular rear wall, with a bore therethrough and supporting a stationary bearing shaft horizontally arranged therein for rotatably supporting *an* impeller thereon.

This invention has for one of its objects the provision in such an apparatus, of a highly satisfactory magnetic coupling that will transmit a satisfactory amount of power to an impeller in a pump housing and hermetically sealed from the moving parts associated with the motor drive shaft arranged outside said pump housing.

Another object of the invention is to provide an electric pumping apparatus consisting of an impeller housing mounted horizontally on the motor supporting bracket, a cup-shaped diaphragm made of non-magnetic material embodying a vertical flange and mounted on said supporting bracket by said flange, a pump housing mounted with said supporting bracket and having the said flange of said diaphragm interposed therebetween, the vertical rear wall of said cup-shaped diaphragm having a central bore extending horizontally therethrough, the smaller rear end of a substantially cylindrical shaft horizontally mounted and sealed within the said bore in said diaphragm and forming a liquid tight seal between the inside of the cup-shaped diaphragm and the exterior of its rear wall, whereby the impeller assembled within the housing may be rotatably mounted upon said stationary shaft.

A further object of this invention is to provide a quick replaceable pump housing without removing any shaft seals or the like, and quick removal of the impeller and its associated magnet simply by withdrawing it from the stationary supporting bearing shaft supported by the cup-shaped diaphragm sealing the interior of the housing from the parts associated with the motor drive shaft.

A still further object of the invention is to provide a sealing unit of this character in which there is no mechanical contact between the rotating impeller hub female bearing and any part of the sealing unit, thereby avoiding friction and wear and reducing maintenance cost to a minimum.

And still a further object of the invention is to provide a centrifugal pump assembly for pumping liquids, the rotary impeller being mounted upon a stationary shaft supported by the diaphragm mounted on the motor supporting bracket and locked in position by suitable means whereby any misalignment of the motor drive shaft will not affect any wear upon the impeller, or between the impeller and its housing.

And still another object of the invention is the provision of a centrifugal pump assembly, a motor horizontally mounted on one side of a hollow mounting bracket and the pump housing mounted upon the opposite side of the bracket, a cup-shaped imperforated diaphragm with a vertical flange interposed between the said bracket and said pump housing, the flange of said diaphragm and the peripheral portion of said pump housing having bores horizontally extending therethrough to receive the mounting studs extending horizontally and outwardly from said bracket, the shaft of the electric motor being mounted in suitable bearings therein and extending outwardly, the drive magnet supporting spider assembled upon said drive shaft and within said hollow supporting bracket, the rear wall of said cup-shaped diaphragm supporting a stationary cylindrical bearing shaft therein and extending outwardly, an impeller having a hub portion with a driven magnet pressed securely thereon and embodying an internal female bearing is mounted on said stationary bearing shaft, and the impeller being mounted and hermetically sealed within its pump housing from the moving parts associated with the said motor drive shaft.

The foregoing objects of the invention, and other objects which will become apparent as the description proceeds, are achieved by the provision of a centrifugal pump including a housing, a horizontal inlet conduit formed in the vertical wall portion of said housing, a single-entry impeller rotatably mounted upon a stationary bearing shaft within said housing, a driving magnet and supporting spider mounted upon the outer end of the electric motor drive shaft, a driven magnet sealed upon the exterior of the hub portion of said impeller, and an outlet conduit being provided on the pump housing positioned tangentially on the pump housing periphery.

For a better understanding of this invention, reference should be had to the accompanying drawings and description where similar characters of reference indicate like parts in the several figures of the drawings.

Figure 1:
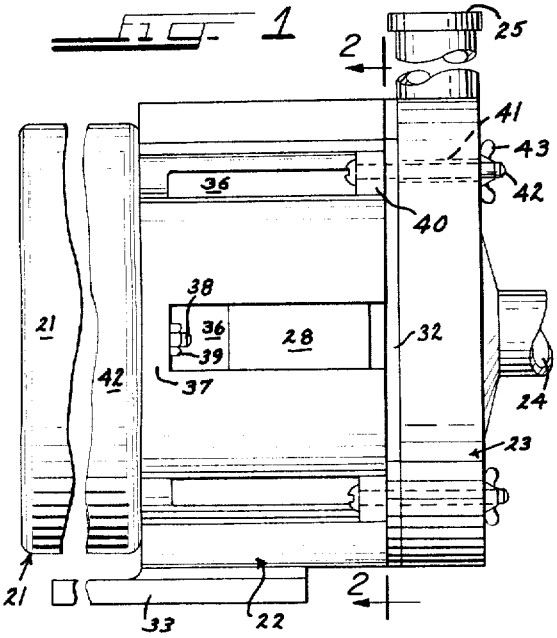
FIGURE 1 is a fragmentary side elevation of the electric motor and pump assembly mounted upon a common mounting bracket.
Figure 2:
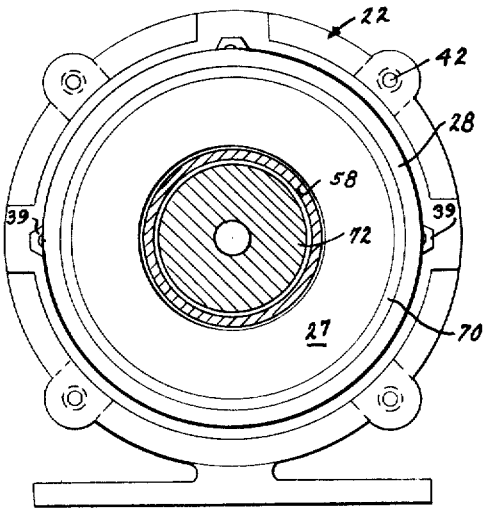
FIGURE 2 is an elevation of the assembly shown in FIG. 1 with the pump housing and diaphragm removed, taken substantially on line 2—2 of FIG. 1.

Referring to the drawing more specifically, 20 designates a centrifugal pump including an electric motor 21, a motor housing mounting bracket 22, a pump casing 23, a pump inlet 24, a pump outlet 25, a motor shaft 26, a drive magnet 27, a drive magnet support 28, an impeller shaft 29, an impeller 30, a driven magnet 31, a non-magnetic shield 32 and a motor housing 34.

The mounting bracket 22 consists of a solid base 33 with cylindrical housing 34 mounted horizontally thereon, said housing having a substantially closed rear end with a circular shaped rear wall 35, the housing 34 having a plurality of longitudinal openings 36 arranged therein with bosses arranged in the opposite ends thereof, the rear bosses 37 arranged with the motor housing by threaded studs 38 extending therethrough and into said motor housing and secured by nuts 39. The bosses 40 arranged in the opposite ends of said openings 36 have threaded bores 41 arranged horizontally therein. The pump housing 23 has four equally spaced bores 41 arranged ninety degrees apart and adjacent the outer periphery thereof. Headed mounting studs 42 are assembled in said bores 41, with the free ends extending outwardly therefrom. Said pump housing 23 is assembled upon said studs 42 and tightly secured to the cylindrical housing 34 by wing nuts 43. The flanged non-magnetic seal 32 with flange 57 is arranged with four holes therein to fit over the studs and is assembled between the housing 34 and the pump casing 23. The pump casing 23 and seal 32 are tightly secured to the housing 34 by turning the wing-nuts 43 in a clockwise direction. The pump casing 23 is formed of plastic or other suitable material, formed with a circular impeller chamber 46 therein. The bores 41 of said pump casing 23 are slightly greater in diameter than the diameter of the threaded studs 42 whereby the casing 23 will slide over the threaded studs and be secured by said wing nuts 43. An O-ring 82 made of a resilient material is assembled between the pump casing 23 and flange 57 of shield 32 to make a tight seal therebetween.

Figure 8:
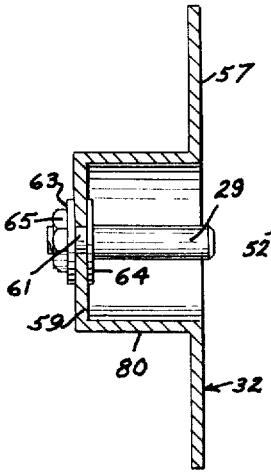
FIGURE 8 is a vertical sectional view of the diaphragm with the bearing shaft assembled therewith.
Figure 9:
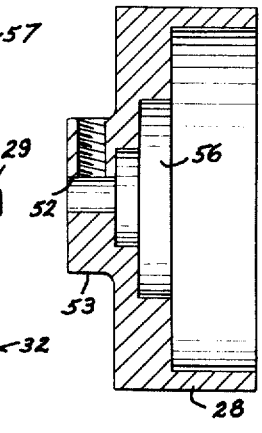
FIGURE 9 is a vertical sectional view of the drive magnet spider, or supporting member.
Figure 10:
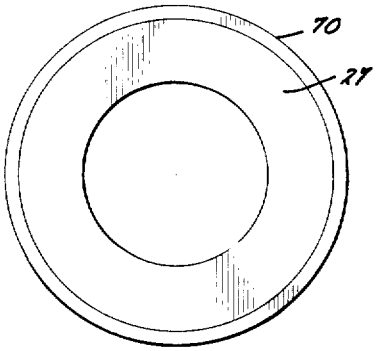
FIGURE 10 is a front elevational view of the driving magnet.

The motor 21 is shown having a shaft 26 extending through a bore 50 centrally arranged in said rear wall 35 of said housing 34, said shaft 26 snugly received in the bore 52 of a tubular connecting hub 53 of the driving magnet support 28 of the present invention. A countersunk locking screw 54 is provided for positive connection between the hub 53 and the shaft 26 of the motor 21. The driving magnet support member 28 is a hollow cylinder having a closed rear end wall 55 from which the hub 53 is formed, said wall 55 having a double stepped recessed portion 56 on the inner side thereof. The opposite end of the cylindrical driving member 28 is open and receives the non-magnetic shield member 32, said shield having a greatly reduced sized drum portion 58 with rear end wall 59 and provided with the annular mounting flange 57, for placement over the studs 42. The rear wall 59 is provided with a central bore 60 adapted to receive the rear end portion 61 of reduced diameter relative to the forward end portion 62 of the impeller shaft 29. A pair of washers 63 and 64 are positioned on opposite sides of said rear wall 59 about said bore 60 through which said rear end portion 61 of impeller shaft 29 extends. A threaded nut 65 is screwed upon the threaded rear end of impeller shaft 29, secured and sealing the bore 60 closed by said washers 63 and 64 thereon. It is clearly seen that the shield member 32 of cup shape, with its bore 60 closed by the rear end of impeller shaft and washers is substantially imperforated; the rear wall 59 thereof forming the sole support for said impeller shaft, claimed by this invention; see FIG. 8.

Figure 3:
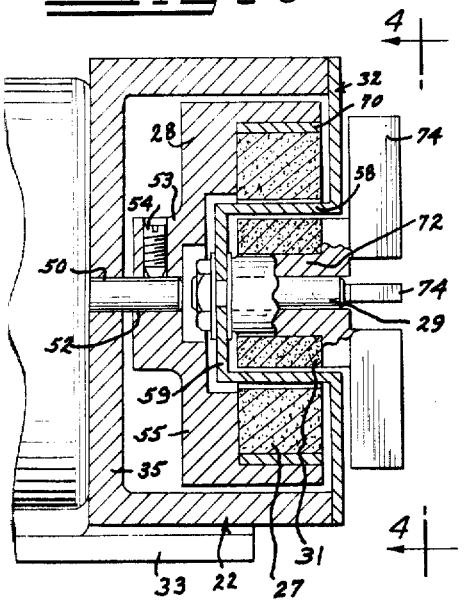
FIGURE 3 is a fragmentary side elevation of the invention shown in FIG. 1, with the pump housing removed and showing the bracket open with the diaphragm, magnets and spider support in section.
Figure 4:
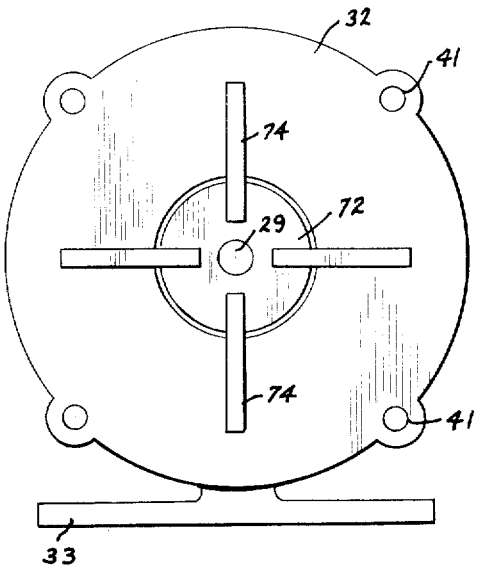
FIGURE 4 is an elevation of the assembly shown in FIG. 3, taken substantially on line 4—4 of FIG. 3.
Figure 5:
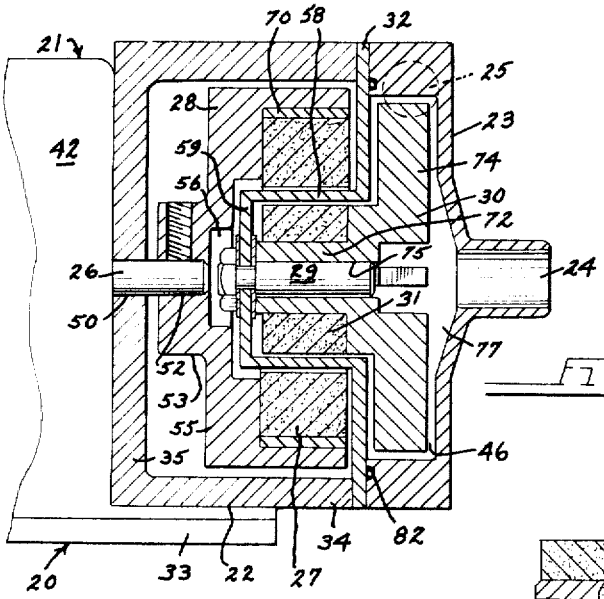
FIG. 5 is a fragmentary elevation of the assembly shown in FIG. 1, with the bracket open and showing the pump housing, impeller, magnets, and spider shown in section.
Figure 6:
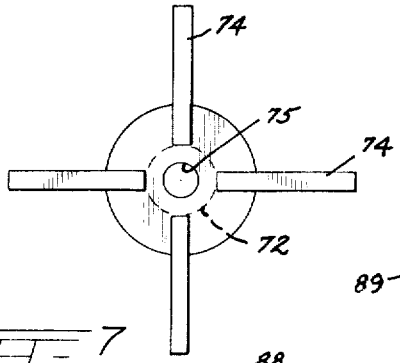
FIGURE 6 is a front elevational view of the impeller.
Figure 7:
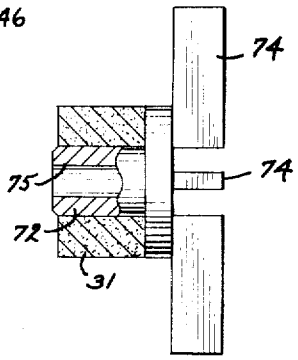
FIGURE 7 is a side elevational view of the impeller with a rear portion of the hub broken away.

The magnets 27 and 31 are arranged in vertical alignment and are separated by said non-magnetic seal 32. The magnets 27 and 31, as shown by FIGURES 3 and 5, are ring shape in configuration. The drive magnet is a ceramic type magnet with a steel ring 70 mounted upon its peripheral surface. The steel ring is pressed into intimate contact with the internal surface of said drive magnet support 28; a press fit which does not require additional means to provide the necessary holding means. The driven magnet 31, also a ceramic type magnet, is assembled upon the exterior surface of the impeller hub 72 by a press fit and forms a rigid part to revolve with the impeller 30. The hub 72 is provided with a cylindrical central bore 75 and is pressed upon the forward portion 62 of the impeller shaft 29 and is rotatable therewith. The opposite end of said impeller 30 is provided with four impeller blades 74 integrally secured with the formed end of said hub 72. The impeller blades 74 terminate short of the horizontal central axis of the impeller, leaving a central area free of obstructions and in axial alignment with the inlet 24. The blades 74 when revolving will draw the liquid through the inlet 24 into the impeller chamber 77 and out through the outlet 25; see FIG. 5. It is clearly seen that it is impossible for the liquid in the impeller chamber to contact any means for operating the impeller 30. The non-magnetic shield 32, with its flange 57, separates the interior of the pump casing, or impeller chamber 77, and the interior of the bracket housing 34 from one another. In general, said shield 32 has the shape of a bowl or cup with a peripheral flange portion 57 at its circumference in a sealing manner fixed between housing 34 and pump casing 23, and with its cylindrical ring part 80 extending between the magnet rings 27 and 31, with an insignificant spacing from the magnets. The shield 32 is made of a non-magnetic material and is passed through by the magnetic flux emanating from the magnetic elements forming a closed magnetic circuit. The drive magnet 27 is so mounted upon its revolving support 28 that the gap between the driver magnet and the horizontal ring part 80 of the shield 32 is very small. The driven magnet 31 is solely mounted upon the hub 72 of impeller 30. The driver magnet and the driven magnet according to this invention may be permanent magnets having a plurality of poles purchaseable in the open market under the trade name "Ceramic"; or any suitable material such as barium ferrite $$(BaFe_{12}O_{19})$$

The magnet rings 27 and 31 may have different dimensions in axial direction, as the ring 27 is arranged vertically over and around the magnet 31 in a vertical plane. The axial dimension of the individual rings is a decisive factor for the magnitude of the torque transferred and required to pump liquids by this type pump.

Figure 11:
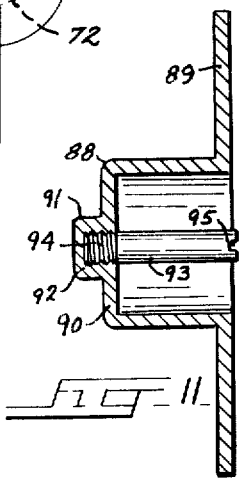
FIG. 11 is a view similar to FIG. 8, only imperforated.

It is believed the modification shown by FIG. 11 is novel; the rear wall 90 of the reduced drum portion 88 of shield member 89 is imperforated and has a hub portion 91 extending rearwardly therefrom. The hub portion 91 has a threaded bore 92 horizontally arranged therein. The stationary impeller shaft 93 has a threaded rear end portion 94 and has a screw-driver slot 95 in the forward end thereof; said shaft 93 being screwed into the threaded bore 92. It is clearly seen that the shaft 93 is solely supported by said shield member 89 and leaving the drum portion 88 imperforated.

The foregoing description and the drawings make the construction and operation of the invention obvious to one skilled in the art. The motor 21 delivers power to the shaft 26 which turns the drive magnet support 28 and drive magnet 27 secured therein. The magnetic flux between matching poles of the magnets causes the impeller 30 to turn upon shaft 29 at the same angular velocity as the shaft 26. The apparatus is substantially corrosion proof because all elements are made of materials which are not normally corrodible, and the liquid being pumped is confined in the impeller chamber 77, sealed from any driving parts by the seal 32, or shield member 89.

Having thus described the present invention so that others skilled in the art may be able to understand and practice the same, it will be understood that the embodi-ment of the present invention may be effected without departing from the novel spirit and scope thereof.

I claim:

1. A pump assembly of the class described comprising, a mounting bracket having a supporting base with a bracket housing horizontally arranged and supported thereon, a motor mounted on one end of said bracket housing, a motor drive shaft extending horizontally through an opening in the end wall of said bracket adjacent said motor, a centrifugal pump casing assembled upon the opposite end of said bracket housing, an impeller chamber in said casing, a non-magnetic shield of cup shaped configuration having a drum portion with a peripheral flange, said flange of said shield mounted between said bracket housing and said pump housing, said shield having a vertical circular rear wall with a central bore therein, an impeller supporting shaft mounted within said bore in said shield and effecting closure thereof, said impeller supporting shaft extending forwardly from rear wall of said shield within said drum portion, an impeller arranged in said impeller chamber, said impeller having a rearwardly extending hub extending within said drum of said shield and rotatably mounted upon the forward free end portion of said impeller supporting shaft attached to said shield, a hollow cylindrical shaped driving magnet support open at its forward end having a vertical rear wall, said magnet support secured upon the forward end portion of said motor drive shaft extending within said bracket housing, a ring type driving magnet vertically arranged within said magnet support adjacent the open end thereof and secured to the interior cylindrical surface thereof, a ring type driven magnet vertically arranged within said drum portion of said shield and secured directly upon the exterior surface of said hub of said impeller and rotatable therewith, and said pump casing having an inlet opening and a discharge opening therein.

2. A pump assembly of the class described comprising, a mounting bracket having a supporting base with a bracket housing horizontally arranged and supported thereon, a motor mounted on the rear end of said bracket housing, a motor drive shaft extending horizontally from said motor and through an opening in the rear end wall of said bracket adjacent said motor, a centrifugal pump casing assembled upon the opposite end of said bracket housing, an impeller chamber in said casing, a non-magnetic shield of cup shaped configuration having a drum portion with a peripheral flange, said flange of said shield mounted between said bracket housing and said pump casing, said shield having a vertical circular rear wall with a central bore therein, the rear end of an impeller supporting shaft mounted within said bore in said shield and secured therein and effecting closure thereof, the free end of the impeller supporting shaft extending forwardly from said rear wall of said shield and within said drum portion, an impeller arranged in said impeller chamber, said impeller having a rearwardly extending hub extending within said drum of said shield and rotatably mounted upon the forward free end portion of said impeller supporting shaft attached to said shield, a hollow cylindrical shaped driving magnet support open at its forward end having a vertical rear wall and a rear hub, said hub of said magnet support secured upon the forward end portion of said motor drive shaft extending within said bracket housing, a ring type driving magnet vertically arranged within said magnet support adjacent the open end thereof and secured to the interior cylindrical surface thereof, a ring type driven magnet vertically arranged with said drum portion of said shield and secured directly upon the exterior surface of said hub of said impeller and rotatable therewith, and said pump casing having an inlet opening and a discharge opening for conveying liquid therethrough by rotation of said impeller.

3. A pump assembly of the class described comprising, a mounting bracket having a supporting base with a bracket housing horizontally arranged and supported thereon, a motor mounted on the rear end of said bracket housing, a motor drive shaft extending horizontally from said motor and through an opening in the end wall of said bracket adjacent said motor, a centrifugal pump casing assembled upon the opposite end of said bracket housing, an impeller chamber in said casing, a non-magnetic shield of cup shaped configuration having a drum portion with a peripheral flange, said flange of said shield mounted between said bracket housing and said pump casing, said shield having a vertical circular rear wall with a central bore therein, the rear end of an impeller supporting shaft mounted within said bore in said shield and secured therein and with said rear wall effecting closure thereof, the free end of the impeller supporting shaft extending forwardly from said rear wall of said shield and within said drum portion, an impeller arranged in said impeller chamber, said impeller having a rearwardly extending hub extending within said drum of said shield and rotatably mounted upon the forward free end portion of said impeller supporting shaft attached to said shield, a hollow cylindrical shaped driving magnet support open at its forward end having a vertical rear wall, and a rear hub, said hub of said magnet support secured upon the forward end portion of said motor drive shaft extending within said bracket housing, a ring type driving magnet vertically arranged within said magnet support adjacent the open end thereof and secured to the interior cylindrical surface thereof, a ring type driven magnet vertically arranged within said drum portion of said shield and secured directly upon the exterior surface of said hub of said impeller and rotatable therewith, said driven magnet being in the same vertical plane embodying said driving magnet, and said pump casing having an inlet opening and a discharge opening for conveying liquid therethrough by said impeller.

4. A pump assembly of the class described comprising, a mounting bracket having a supporting bore with a bracket housing horizontally arranged and supported thereon, a motor mounted on one end of said bracket housing, a motor drive shaft extending horizontally from said motor and through an opening in the end wall of said bracket adjacent said motor, a centrifugal pump casing assembled upon the opposite end of said bracket housing, an impeller chamber in said casing, a non-magnetic shield of cup shaped configuration having a drum portion with a peripheral flange, said flange of said shield mounted between said bracket housing and said pump casing, said shield having a vertical circular rear wall with a central bore therein, an impeller supporting shaft mounted with its rear end portion within said bore in said shield, a pair of washers mounted upon said supporting shaft and arranged on opposite sides of said rear wall of said shield, a threaded nut mounted in the rear end of said supporting shaft and effecting closure of said bore, said impeller supporting shaft extending forwardly from said rear wall of said shield within said drum portion, an impeller arranged in said impeller chamber, said impeller having a rearwardly extending hub extending within said drum of said shield and rotatably mounted upon the forward free end portion of said impeller supporting shaft attached to said shield, a hollow cylindrical shaped driving magnet support open at the forward end having a vertical rear wall and a rear hub, said hub of said magnet support secured upon the forward end portion of said motor drive shaft extending within said bracket housing, a locking screw, a ring type driving magnet vertically arranged within said magnet support adjacent the open end thereof and secured to the interior cylindrical surface thereof, a ring type driven magnet vertically arranged within said drum portion of said shield and secured directly upon the exterior surface of said hub of said impeller and rotatable therewith, said pump casing having an inlet opening and a discharge opening whereby rotation of said motor shaft and said driving magnet effects rotation of said driven magnet and said impeller.

5. A magnetically driven pump comprising, a supporting base, a supporting bracket housing mounted horizontally on and above said base, a pump casing having an inlet and an outlet mounted upon studs secured in the forward end of said bracket housing, a motor mounted upon the rear end of said bracket housing, a motor drive shaft extending within said bracket housing, a driving magnet support member, said driving magnet support member being hollow with a rear wall having an axially elongated hub projecting rearwardly therefrom, said hub mounted directly upon said motor drive shaft and rotatable therewith, a ring type driving magnet secured in the interior cylindrical wall of said driving magnet support, a cup shaped shield with a cylindrical drum portion and a flange attached therewith, said flange of said shield mounted upon said studs and between said bracket housing and said pump casing, an impeller with a rearwardly extending hub mounted within said casing and said hub thereof rotatably mounted upon a fixed shaft centrally arranged and secured to said shield and extending forwardly within said drum portion of said shield, a ring type driven magnet secured to the exterior surface of said hub of said impeller, the cylindrical surface of said drum of said shield extending longitudinally and horizontally between said magnets which are arranged in a common vertical plane and rotatable on a common horizontal axis whereby rotation of said drive shaft of said motor will cause rotation of said magnets and said impeller.

6. A magnetically driven pump comprising, a supporting base, a substantially cylindrical supporting bracket housing mounted horizontally on and above said base, a pump casing having an inlet and an outlet mounted upon studs secured in the forward end of said bracket housing, a motor mounted upon the rear end of said bracket housing, a motor drive shaft extending forwardly from said motor and into said bracket housing, a driving magnet support member of C shaped configuration, said driving magnet support member being hollow with a rear wall having an axially elongated hub projecting rearwardly therefrom, said hub mounted directly upon said motor drive shaft by a locking screw and rotatable therewith, a ring type driving magnet secured to the interior cylindrical wall of said driving magnet support, a cup shaped shield with a cylindrical drum portion and a flange attached therewith, said flange of said shield mounted upon said studs and between said bracket housing and said pump casing, an impeller with a rearwardly extending hub mounted within said casing and said hub thereof rotatably mounted upon a fixed shaft centrally arranged and secured to said shield and extending forwardly within said drum portion of said shield, a ring type driven magnet secured to the exterior surface of said hub of said impeller, the cylindrical surface of said drum of said shield extending longitudinally and horizontally between said magnets which are arranged in a common vertical plane and rotatable on a common horizontal axis whereby rotation of said drive shaft of said motor will cause rotation of said magnets and said impeller.

7. A magnetically driven pump comprising, a supporting base, a substantially cylindrical supporting bracket housing mounted horizontally on and above said base, a pump casing having an inlet and an outlet mounted upon studs secured in the forward end of said bracket housing, a motor mounted upon the rear end of said bracket housing, a motor drive shaft extending from said motor and into said bracket housing, a C shaped driving magnet support member, said driving magnet support member being hollow with a rear wall having an axially elongated hub projecting rearwardly therefrom, said hub mounted directly upon said motor drive shaft and rotatable therewith, a ring type driving magnet with a steel ring in its periphery, said steel ring secured to the interior cylindrical wall of said driving magnet support, a cup type shield with a cylindrical drum portion and a circular flange attached therewith, said circular flange of said shield mounted upon said studs and between said bracket housing and said pump casing, an impeller with a plurality of blades and a rearwardly extending hub mounted within said casing, said impeller hub rotatably mounted upon a fixed shaft extending through a bore in said shield and extending forwardly within said drum portion of said shield, a ring-type driven magnet secured to the exterior surface of said hub of said impeller, the cylindrical surface of said drum of said shield *extending* longitudinally and horizontally between said magnets which are arranged in a common vertical plane and rotatable on a common horizontal axis whereby rotation of said drive shaft of said motor will cause rotation of said magnets and said impeller.

8. A [magentically] *magnetically* driven pump comprising, a supporting base, a [hollow] *motor* supporting bracket [mounted horizontally] on said base, a pump casing having an inlet and an outlet *and* mounted upon [studs secured in one end of] said bracket, a motor mounted upon [the opposite end of] said bracket, a motor drive shaft extending [within said bracket] *from said motor,* a driving magnet support member, said driving magnet support member [being hollow] *having a cylindrical cavity* [with a rear wall having an axially elongated] *and a* hub projecting rearwardly therefrom, said hub mounted [directly] upon said motor drive shaft and rotatable therewith, a ring type driving magnet with a [circumferential] *circumambient* steel band thereon secured to the interior cylindrical wall of said driving magnet support, a cup shaped shield with a cylindrical drum portion and a flange *integrally* attached therewith, said flange of said shield mounted [upon said studs and] between said bracket and said pump casing, an impeller with a rearwardly extending hub mounted within said casing and said hub thereof rotatably mounted upon a fixed shaft centrally arranged and [secured] *joined at one end* to *an imperforate wall portion of* said shield *on the inner side thereof* and extending forwardly within said drum portion of said shield, a ring type driven magnet secured to [the exterior surface of] said hub of said impeller, the cylindrical surface of said drum of said shield extending [longitudinally and horizontally] between said magnets which are arranged [in a common vertical plane] *concentrically one circumambient of the other* and rotatable [on] *about* a common [horizontal] axis whereby rotation of said drive shaft of said motor will cause rotation of said magnets and said impeller.

9. [In a] *A* pumping unit of the type described, comprising a hollow type bracket housing with a supporting base member, an electric motor supported upon one end of said bracket housing [and a plurality of the threaded mounting studs extending horizontally and outwardly from the opposite end of said bracket housing], a motor drive shaft [supported within said motor and] extending through [an opening in] said bracket housing, a pump embodying a pump housing, said pump housing having an inlet and outlet, [embodied therewith, said pump housing provided with a plurality of bores to freely pass over said studs, said pump housing mounted upon said studs,] an impeller chamber within said pump housing, a cup shaped non-magnetic shield with a flange, [said flange provided with a plurality of bores to freely pass over said studs,] said flange mounted [upon said studs] between said bracket housing and said pump housing, said shield having a fixed cylindrical shaft [horizontally and] centrally secured thereto *on the inward side of an imperforate wall portion thereof* and extending forwardly therefrom *close to said impeller chamber,* an impeller having a hub rotatably mounted upon said fixed cylindrical shaft, a driving magnet [hollow cylindrical] supporting member secured upon the free end *region* of said motor drive shaft and a ring type driving magnet secured [to the interior cylindrical wall] *thereto* [thereof], a ring type driven magnet secured upon the [exterior cylindrical surface of said] hub of said impeller, said magnets being arranged [in the same vertical plane] *one concentrically circumambient of the other,* the external diameter of said driven magnet being less than the internal diameter of said [drive] *driving* magnet whereby the cup shaped non-magnetic shield may pass therebetween, and *means* [clamping nuts threaded upon said studs] to clamp said pump housing and said flange to said bracket housing effecting a seal.

10. [In a] *A* pumping unit according to claim 9 wherein [said bracket housing and] said pump housing [are] *is* made of plastic material, said magnets being [hard "Ceramic"] *plural-pole* ring magnets with [peripheral] *annular* portions rectangular in cross-section and said shield having one axial [bore] *socket* therein [which is closed by] *with* said fixed shaft secured therein and [effecting] *affording* a [substantially] non-perforated cup shaped shield with a peripheral flange.

*11. In a rotary pump of the type adapted to be magnetically coupled to the shaft of a driving motor, a pump housing including an impeller chamber having inlet and outlet means communicating therewith and a rotatable impeller therein; said housing having a wall portion disposed at right angles to the axis of rotation of the impeller; means supporting the impeller for rotation comprising a cylindrical protuberance defining a small compartment formed as an integral part of said housing wall and of cylindrical configuration internally and externally and projecting outwardly axially beyond said wall with its cylinder axis in alignment with the impeller axis of rotation, said compartment having at its outer end an imperforate end wall with a stud shaft joined thereto centrally and having a free salient end extending forwardly therefrom toward said pumping chamber in alignment with said impeller axis; means on said impeller providing a hub portion extending therefrom into said compartment and rotatably supported on said stud shaft; a ring-shaped driven magnet fixed upon said hub portion; a ring-shaped driving magnet disposed for rotation closely circumambiently about the external periphery of said compartment concentrically of said impeller axis and driven magnet and magnetically coupling with the latter to rotate the impeller responsive to rotation of the driving magnet; a motor having a driving shaft and means mounting the same in axial alignment with said impeller axis; and means on said motor shaft supportably engaging said driving magnet for rotation in relation to the driven magnet as aforesaid.*

*12. In rotary pumping devices and the like of the type having a rotatable impeller adapted to be driven from a motor through magnetic coupling means, improvements comprising: a housing structure formed with an impeller compartment having an integral wall normal to the axis of rotation of the impeller, said wall having formed as an integral part thereof an outwardly-projecting magnet chamber of cylindrical shape externally and having a cylindrical internal bore defining said chamber, the cylinder axis being aligned with the impeller axis, said chamber bore being closed at its outer end by an endwall which is imperforate and opening at its opposite end into said impeller compartment, said impeller having as its sole rotative support a short shaft joined at one end to said chamber endwall in fixed alignment with the impeller axis and projecting forwardly in the chamber bore toward said impeller compartment; magnet supporting means rotatable with said impeller and extending therefrom into said chamber bore in alignment with the axis thereof and into supporting engagement with said shaft; a driven multi-polar permanent magnet in the shape of a closed cylindrical ring carried concentrically of said axis on said impeller supporting means with its outer periphery freely rotatable in close proximity to the internal periphery of the cylindrical chamber bore; and means for rotating the impeller including another multi-polar permanent magnet likewise of cylindrical ring shape and having a bore a substantial portion of which fits freely but closely around a substantial portion of the external periphery of said chamber for rotation of the driving magnet thereabout, the magnetic fields of said magnets reacting to effect rotation of the driven ring magnet and the impeller responsive to rotation of the driving magnet; and motor means supporting said driving magnet in operative relation to the chamber and driven magnet as aforesaid and operable to rotate the same thereabout.*

References Cited by the Examiner

The following references, cited by the Examiner, are of record in the patented file of this patent or the original patent.

UNITED STATES PATENTS

| | | | |
|---|---|---|---|
| 2,366,562 | 1/1945 | Schug | 230—117 |
| 2,970,548 | 2/1961 | Berner | 103—87 |
| 3,001,479 | 9/1961 | Swenson et al. | 103—87 |
| 3,144,573 | 8/1964 | Bergey et al. | |

ROBERT M. WALKER, *Primary Examiner.*